Aug. 5, 1958

E. S. STODDARD 2,846,387

APPARATUS FOR EXTRACTING THE IONS OF
ELECTROLYTES FROM LIQUID SOLVENTS

Filed Dec. 29, 1953

INVENTOR.
Edgar S. Stoddard
BY
Smith, Olsen, Baird & Gulbrandsen
Attys.

Aug. 5, 1958     E. S. STODDARD     2,846,387
APPARATUS FOR EXTRACTING THE IONS OF
ELECTROLYTES FROM LIQUID SOLVENTS
Filed Dec. 29, 1953     3 Sheets-Sheet 2

FIG. 2

INVENTOR.
Edgar S. Stoddard
BY
Smith, Olsen, Baird & Gulbrandsen
Attys.

Aug. 5, 1958 E. S. STODDARD 2,846,387
APPARATUS FOR EXTRACTING THE IONS OF
ELECTROLYTES FROM LIQUID SOLVENTS
Filed Dec. 29, 1953 3 Sheets-Sheet 3

INVENTOR.
Edgar S. Stoddard
BY
Smith, Olsen, Baird & Gulbrandsen
Attys.

United States Patent Office 2,846,387
Patented Aug. 5, 1958

2,846,387

APPARATUS FOR EXTRACTING THE IONS OF ELECTROLYTES FROM LIQUID SOLVENTS

Edgar S. Stoddard, Berwyn, Ill., assignor to General Electric Company, a corporation of New York Application December 29, 1953, Serial No. 400,944

17 Claims. (Cl. 204—229)

The present invention relates to apparatus for extracting the ions of electrolytes from liquid solvents, and more particularly to such apparatus that is especially useful in demineralizing raw water; and it is a general object of the present invention to provide apparatus of the character noted that is expressly designed for home use.

Raw water frequently contains a dissolved solids count of 250 p. p. m. and higher, comprising dissolved electrolytes yielding such cations as: $Ca^{++}$, $Mg^{++}$, $Fe^{++}$, $Na^+$, $K^+$, etc., and such anions as: $SO_4^-$, $Cl^-$, $NO_3^-$, $HCO_3^-$, etc.; whereby it is totally unsuitable for use in many industrial chemical processes and very objectionable in carrying out such simple household processes as washing clothes, washing dishes, etc. Moreover, such raw water is undesirable for drinking purposes, wasteful of detergent in washing operations, productive of stains and foreign deposits in cooking operations, productive of scale in water tanks and piping, etc.

Now the utilization of zeolites in home water softening units is helpful in the removal of calcium and magnesium cations, but the exchanged sodium cations may be found to be undesirable in certain cases; and in any case, the necessary regeneration of the zeolites is highly objectionable to the home user. While electrolytic type equipment has been suggested for general use and synthetic organic resin type ion exchange apparatus has been used in industrial chemical equipment and in municipal water-treatment plants, none of this equipment and apparatus has been expressly designed for home use; whereby the technical advancements in these fields have been denied the usual household.

Accordingly, it is another object of the invention to provide a raw water demineralizing cell that utilizes an electrolytic action and both cation and anion exchange actions, and that is expressly designed as a home unit, so that it requires no regeneration, attention or supervision on the part of the home user in the operation thereof.

Another object of the invention is to provide a cell for extracting the ions of electrolytes from liquid solvents that is of improved, simplified and economical construction and arrangement.

A further object of the invention is to provide an improved system for extracting the ions of electrolytes from liquid solvents that employs the improved cell mentioned.

Further features of the invention pertain to the particular arrangement of the elements of the system and of the cell, whereby the above-outlined and additional operating features thereof are attained.

The invention, both as to its organization and method of operation, together with further objects and advantages thereof, will best be understood by reference to the following specification taken in connection with the accompanying drawings, in which:

Figs. 2 and 3 constituting vertical sectional views of the left-hand cell mentioned, taken along two vertical planes disposed at right angles to each other.

Figure 1:
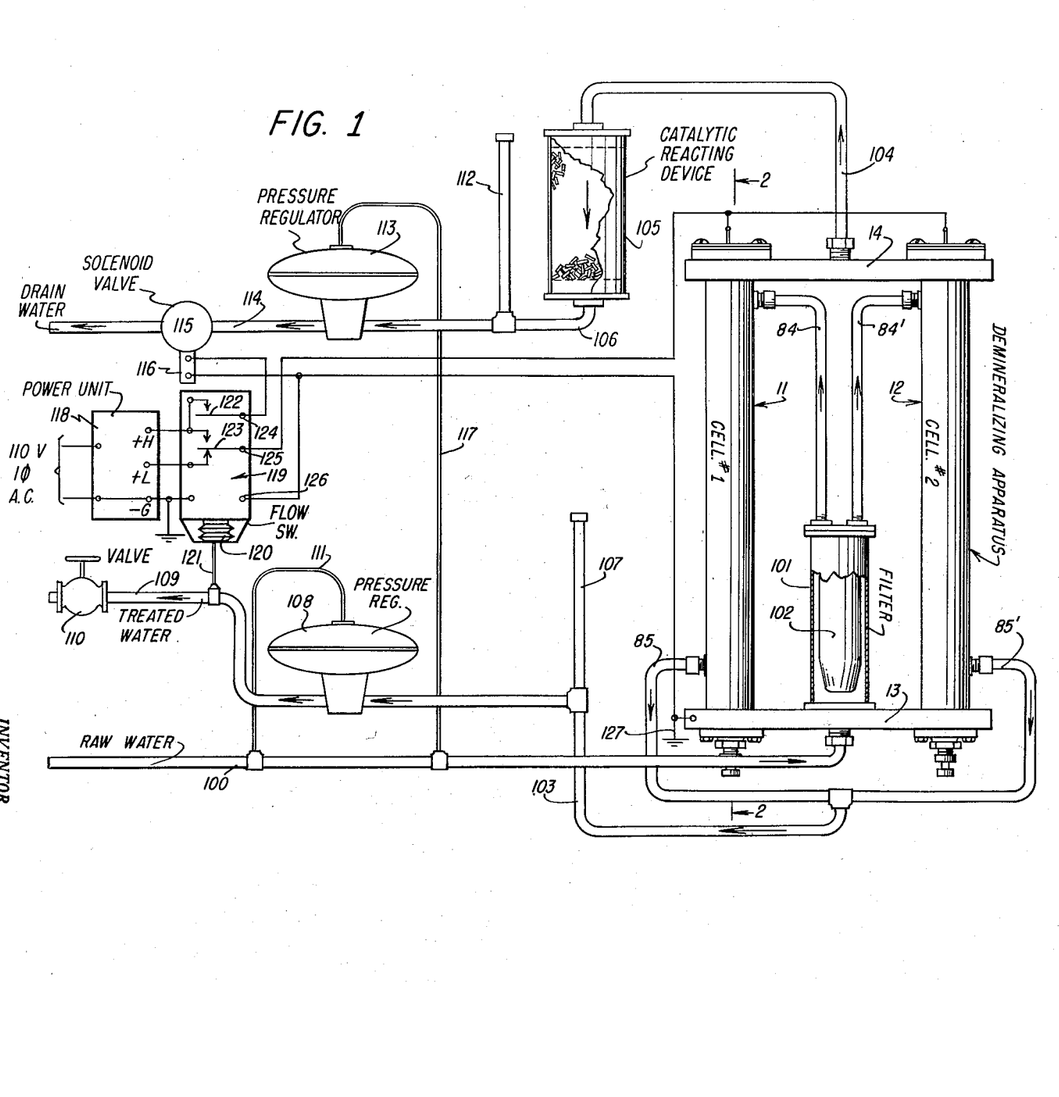
Figure 1 is a combined schematic diagram of a system for extracting the ions of electrolytes from liquid solvents and a front elevational view of a pair of cells employed therein for the purpose noted, and embodying the present invention.
Figure 2:
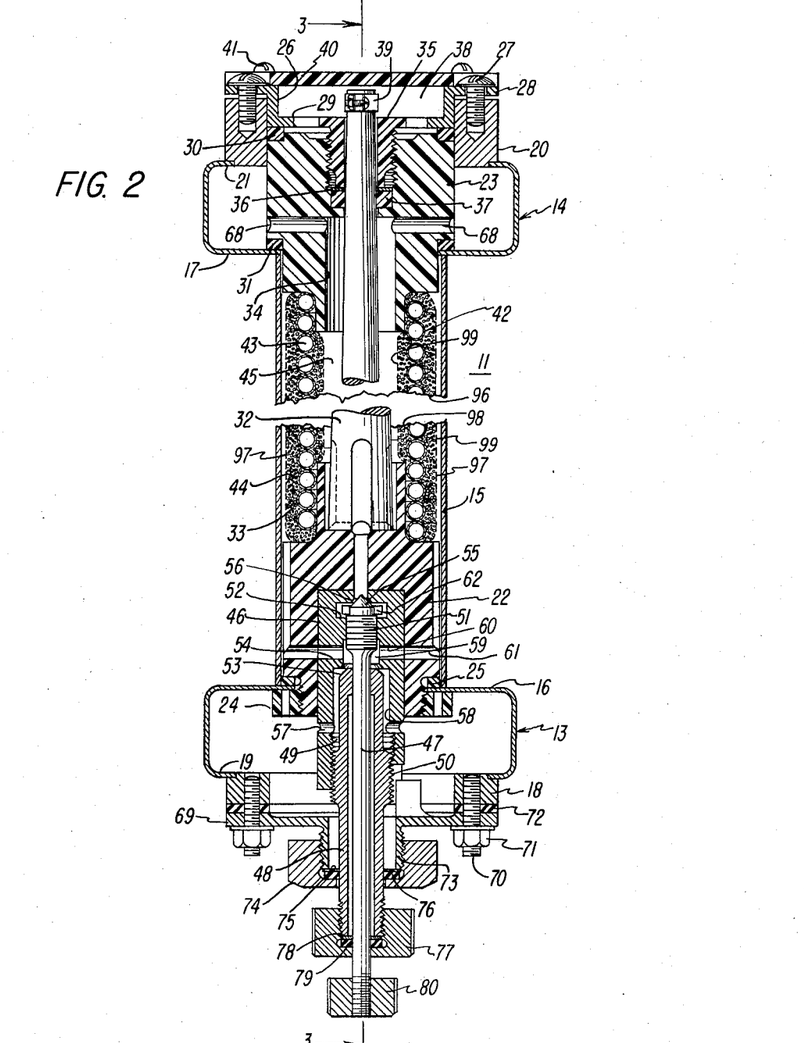
Fig. 2 is an enlarged vertical sectional view of the left-hand cell shown in Fig. 1, taken in the direction of the arrows along the line 2—2 in this figure.
Figures 3, 4:
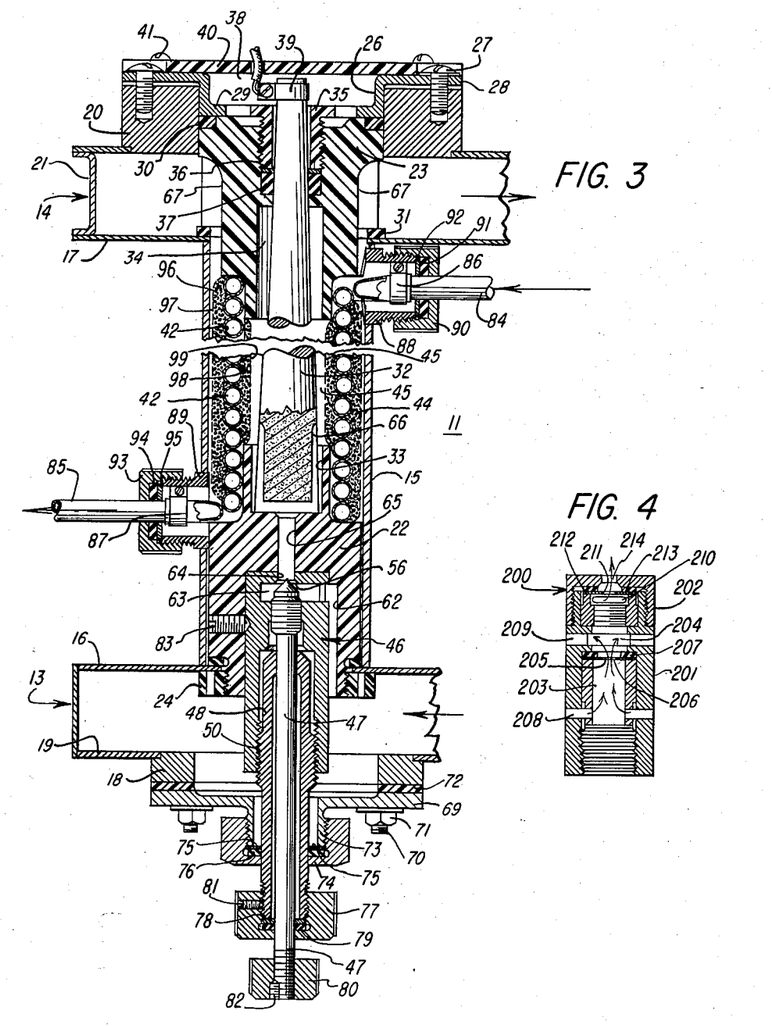
Fig. 3 is another enlarged vertical view of the left-hand cell mentioned, taken in the direction of the arrows along the line 3—3 in Fig. 2.
Fig. 4 is an enlarged vertical sectional view, similar to Fig. 2, of a modified form of mechanism for controlling the flow of two of the streams of solvent through the left-hand cell shown in Figs. 2 and 3.

Referring now to Fig. 1 of the drawings, the system and apparatus for extracting the ions of electrolytes from liquid solvents there illustrated, and embodying the features of the present invention, is expressly designed for demineralizing raw water, and is particularly constructed and arranged for home use. More particularly, a plurality of upstanding cells, two of which are respectively generally indicated at 11 and 12, are arranged between a lower header 13 and an upper header 14 disposed in vertically spaced-apart relation. Preferably, the cells 11 and 12 are substantially identical; and the left-hand cell 11 comprises, as shown in Figs. 2 and 3, an upstanding imperforate tubular casing 15 extending between the upper wall 16 of the lower header 13 and the lower wall 17 of the upper header 14, the lower and upper ends of the casing 15 being suitably secured in liquid-tight relation to the respective walls 16 and 17 by welding, or the like, and respectively registering with corresponding openings formed in the walls 16 and 17. A lower mounting ring 18 is arranged in a concentric opening formed in the lower wall 19 of the lower header 13 and secured in liquid-tight relation with the wall 19 by welding, or the like; and similarly, an upper mounting ring 20 is arranged in a concentric opening formed in the upper wall 21 of the upper header 14 and secured in liquid-tight relation with the wall 21 by welding, or the like. Preferably, the headers 13 and 14 and the casing 15 are formed of stainless steel, and the rings 18 and 20 are formed of brass.

Arranged commonly in the central upper portion of the lower header 13 and in the central lower portion of the casing 15 is a lower insulating block 22; and similarly, arranged commonly in the central portion of the upper header 14 and in the central upper portion of the casing 15 is an upper insulating block 23; which blocks 22 and 23 are preferably formed of the thermoplastic moulded plastic resin of the polymethylmethacrylate type sold under the name "Lucite." The lower end of the insulating block 22 is threaded and projects into the upper central portion of the lower header 13 and receives a cooperating threaded insulating ring 24 that is preferably formed of the thermosetting moulded plastic resin of the phenol-formaldehyde type sold under the name "Bakelite." More particularly, the threaded engagement between the insulating block 22 and the insulating ring 24 clamps the insulating block 22 securely in place to the upper wall 16 of the lower header 13 in liquid-tight relation therewith, a ring-like rubber gasket 25 being disposed between the adjacent portions of the wall 16 and the block 22 to insure a liquid-tight seal therebetween. The upper insulating block 23 is secured in place by an associated clamping plate 26 that is arranged in the upper end of the mounting ring 20 and secured in place by a plurality of screws 27, the screws 27 extending through cooperating openings provided in an upper outwardly projecting annular flange 28 carried by the clamping plate 26 and arranged in threaded engagement with cooperating holes provided in the mounting ring 20. Preferably, the clamping plate 26 is formed of brass, and carries a lower inwardly projecting annular flange 29 that is arranged directly to bear upon a ring-like rubber gasket 30 disposed in an annular groove formed in the top of the insulating block 23. Also, a ring-like rubber gasket 31 is arranged in surrounding relation with the intermediate portion of the insulating block 23 at the adjacent surface of the lower wall 17 of the upper header 14, the gaskets 30 and 31 sealing the insulating block 23 in liquid-tight relation with the mounting ring 20 and with the lower wall 17 of the upper header 14.

The casing 15 constitutes one electrode of the cell 11; and the other electrode thereof may take the form of a centrally disposed rod-like element 32, that is preferably formed essentially of carbon; whereby the electrode 15 constitutes the cathode and the electrode 32 constitutes the anode of the cell 11. The anode 32 is upwardly tapered, the lower larger end of the anode 32 being arranged in a cylindrical pocket 33 formed in the central upper portion of the lower insulating block 22, and the upper smaller end of the anode 32 projecting through a centrally disposed opening 34 formed in the upper insulating block 23. The upper end of the anode 32 is located by a surrounding insulating thimble 35 arranged in threaded engagement with an associated threaded opening provided in the upper end of the upper insulating block 23. Preferably, the thimble 35 is formed of "Bakelite," and the lower end thereof engages an annular washer 36 surrounding the anode 32 and bearing upon an associated ring-like rubber gasket 37, also surrounding the anode 32 and arranged in a cooperating annular recess provided in the intermediate portion of the upper insulating block 23. Accordingly, the upper end of the anode 32 is securely located by the arrangement of the insulating thimble 35, together with the annular washer 36 and the gasket 37, the gasket 37 also sealing the upper end of the anode 32 and the upper insulating block 23 in liquid-tight relation. The extreme upper end of the anode 32 is disposed within the annular cavity 38 formed in the clamping plate 26, and carries a metal clip 39 constituting an electrical terminal and arranged in the cavity 38. The upper end of the cavity 38 is closed by an annular insulating plate 40 that is preferably formed of "Bakelite" and secured in place upon the annular flange 28 of the clamping plate 26 by a series of screws 41.

Also the cell 11 comprises an upstanding substantially cylindrical hollow structure 42, surrounding the anode 32, housed within the casing 15, and extending between the lower and upper insulating blocks 22 and 23. The structure 42 is spaced outwardly with respect to the anode 32 and inwardly with respect to the cathode 15 and essentially comprises a helical tube of textile fabric that has been impregnated with a suitable insoluble filler. For example, the tube mentioned may be essentially formed of woven or knitted cotton yarn impregnated with a solution of cellulose acetate. Alternatively, the tube mentioned may be formed of one of the synthetic linear polyamides of the type obtained by the polymerization of a diamine with a dibasic carboxylic acid sold under the name "nylon"; and other fillers such as collodion, etc., may be employed, if required. Accordingly, the hollow structure 42 extending between the lower and upper insulating blocks 22 and 23 not only defines an elongated upstanding sinuous first chamber 43 within the interior thereof, but also defines an elongated upstanding second chamber 44 exteriorly thereof and adjacent to the cathode 15, and an elongated upstanding third chamber 45 interiorly thereof and adjacent to the anode 32. Moreover, the exterior wall of the composite structure 42 constitutes a first membrane or diaphragm disposed between the chambers 43 and 44, while the interior wall of the composite structure 42 constitutes a second membrane or diaphragm disposed between the chambers 43 and 45; which membranes or diaphragms are permeable to the ions of an electrolyte dissolved in a first stream of water passing through the first chamber 43, but prevent any substantial liquid diffusion therethrough and the consequent mixing of the first stream of water with either one of the second and third streams of water respectively passing through the second and third chambers 44 and 45; whereby these above-described membranes or diaphragms are hereinafter referred to as being "permeable."

Further, the cell 11 comprises composite valve structure for regulating independently the flow of a second stream of water through the second chamber 44 and a third stream of water through the third chamber 45; which composite valve structure includes a substantially inverted cup-shaped valve casing 46 arranged in a centrally disposed substantially inverted cup-shaped cavity provided in the lower end of the lower insulating block 22, as well as a central valve stem 47 and a surrounding tubular valve element 48. Preferably the parts 46, 47 and 48 are formed of stainless steel, the lower end of the valve casing 46 being internally threaded, as indicated at 49, and engaging a cooperating thread 50 provided on the intermediate exterior surface of the valve element 48, and the upper end of the valve stem 47 being externally threaded, as indicated at 51, and engaging a cooperating thread provided in a central opening formed in an internal flange 52 carried by the valve casing 46; whereby the valve element 48 and the valve stem 47 are independently movable in the vertical direction with respect to the valve casing 46. The upper end of the valve element 48 terminates in a frusto-conical valve surface 53 that cooperates with a valve seat 54 carried by the internal structure of the valve casing 46; and the upper end of the valve stem 47 terminates in a conical valve surface 55 that cooperates with a valve seat 56 carried by the internal structure of the valve casing 46.

Moreover, as best shown in Fig. 2, the interior of the lower header 13 communicates through a number of holes 57 provided in the lower end of the valve casing 46 with a lower chamber 58 disposed between the valve element 48 and the valve casing 46 and thence through the annular space adjacent to the valve seat 54 with an upper chamber 59 disposed between the upper end of the valve stem 47 and the valve casing 46, and ultimately through a number of holes 60 provided in the upper end of the valve casing 46 and a number of communicating holes 61 formed in the lower end of the lower insulating block 22 with the lower end of the second chamber 44. Similarly, as best shown in Fig. 3, the interior of the lower header 13 communicates with an upstanding slot 62 formed in the lower end of the insulating block 22 and then with an annular cavity 63 formed in the upper end of the valve casing 46 and thence through the annular space adjacent to the valve seat 56 with a hole 64 disposed in the upper wall of the valve casing 46 and a communicating centrally disposed hole 65 formed in the intermediate portion of the lower insulating block 22 and then into the bottom of the cylindrical pocket 33 formed in the upper end of the lower insulating block 22, and ultimately through a number of upstanding slots 66 formed in the lower end of the anode 32 with the lower end of the third chamber 45. As best shown in Fig. 3, the upper end of the second chamber 44 communicates directly through a number of slots 67 provided in the lower end of the upper insulating block 23 with the interior of the upper header 14; and as best shown in Fig. 2, the upper end of the third chamber 45 communicates directly through the opening 34 and a number of holes 68 provided in the intermediate portion of the upper insulating block 23 with the interior of the upper header 14.

The lower end of the lower mounting ring 18 is closed by a lower mounting plate 69 secured in place by a plurality of studs 70 and cooperating nuts 71, the upper ends of the studs 70 being threaded into cooperating holes provided in the lower mounting ring 18 and the lower ends of the studs 70 extending through cooperating openings provided in the lower mounting plate 69 and receiving the nuts 71. Preferably, the lower mounting plate 69 is formed of brass; and a ring-like rubber gasket 72 is arranged between the adjacent surfaces of the lower mounting ring 18 and the lower mounting plate 69 in order to provide a liquid-tight seal therebetween. The central portion of the lower mounting plate 69 terminates in a downwardly extending annular thimble 73 surrounding the valve element 48, the exterior surface of the thimble 73 being threaded and receiving a surrounding collar 74. The extreme lower end of the thimble 73 engages an annular washer 75 formed of stainless steel surrounding the valve element 48 that bears against a ring-like rubber gasket 76, and also surrounding the valve element 48; whereby the gasket 76 provides a liquid-tight seal between the thimble 73, the collar 74, and the valve element 48. The extreme lower end of the valve element 48 is exteriorly threaded and receives a surrounding collar 77. The extreme lower end of the valve element 48 engages an annular washer 78 formed of stainless steel surrounding the valve stem 47 that bears against a ring-like rubber gasket 79, and also surrounding the valve stem 47; whereby the gasket 79 provides a liquid-tight seal between the valve element 48, the collar 77 and the valve stem 47. Finally, the extreme lower end of the valve stem 47 is threaded and receives a nut 80. The collar 77 is locked in place on the lower end of the valve element 48 by a set screw 81, as shown in Fig. 3; whereby the collar 77 constitutes a handle for adjusting the vertical position of the valve element 48 so as to adjust the annular space adjacent to the valve seat 54 and consequently the rate of flow of water from the lower header 13 through the second chamber 44 and thence into the upper head 14. The nut 80 is locked in place on the lower end of the valve stem 47 by a set screw 82, as shown in Fig. 3; whereby the nut 80 constitutes a handle for adjusting the vertical position of the valve stem 47 so as to adjust the annular space adjacent to the valve seat 56 and consequently the rate of flow of water from the lower header 13 through the third chamber 45 and thence into the upper head 14.

The position of the valve seat 56 in the cup-shaped cavity formed in the lower end of the lower insulating block 22 is maintained by a set screw 83 arranged in a threaded opening formed in the lower insulating block 22 and projecting into a cooperating depression formed in the valve casing 46, as shown in Fig. 3.

As best shown in Fig. 3, the upper and lower ends of the tube of the composite structure 42 respectively communicate with inlet and outlet conduits 84 and 85, the upper end of the tube mentioned being secured to the adjacent end of the inlet conduit 84 by an associated clamp 86, and the lower end of the tube mentioned being secured to the adjacent end of the outlet conduit 85 by an associated clamp 87. More particularly, an outwardly extending thimble 88 formed of stainless steel is secured in liquid-tight relation with an opening provided in the upper portion of the casing 15 and surrounds the adjacent upper end of the tube mentioned, as well as the inner end of the inlet conduit 84 and the associated clamp 86; and likewise, an outwardly extending thimble 89 formed of stainless steel is secured in liquid-tight relation with an opening provided in the lower portion of the casing 15 and surrounds the adjacent lower end of the tube mentioned, as well as the inner end of the outlet conduit 85 and the associated clamp 87. The outer open end of the thimble 88 is closed by a cooperating cap 90 surrounding the inlet conduit 84 and engaging the threaded exterior of the thimble 88; the thimble 88 and the cap 90 being sealed in liquid-tight relation by a ring-like rubber gasket 91 and a cooperating brass washer 92, both surrounding the inlet conduit 84; likewise, the outer open end of the thimble 89 is closed by a cooperating cap 93 surrounding the outlet conduit 85 and engaging the threaded exterior of the thimble 89, the thimble 89 and the cap 93 being sealed in liquid-tight relation by a ring-like rubber gasket 94 and a cooperating brass washer 95, both surrounding the outlet conduit 85. Thus, it will be understood that the first stream of water that is conducted through the hollow structure 42 enters the upper end thereof from the inlet conduit 84 and leaves the lower end thereof via the outlet conduit 85; whereby the downwardly directed first stream of water passing through the hollow structure 42 is in counterflow relationship with respect to the upwardly directed second and third streams of water that respectively pass through the second and third chambers 44 and 45.

Finally, the cell 11 comprises a first porous bed 96 of cation exchange material arranged in the second chamber 44 in contact with the exterior surface of the composite structure 42 and retained in place by an associated foraminous screen 97 formed of stainless steel, and a second porous bed 98 of anion exchange material arranged in the third chamber 45 in contact with the interior surface of the composite structure 42 and retained in place by an associated foraminous screen 99 formed of stainless steel. The first porous bed 96 comprises an upstanding substantially cylindrical mass of substantially bead-like particles of cation exchange material, and the adjacent foraminous screen 97 not only accommodates the circulation of a first portion of the second stream of water through the first bed 96, but it also defines an unobstructed annular channel exteriorly thereof adjacent to the interior surface of the cathode 15 for the passage of a second portion of the second stream of water into scrubbing relationship with the interior surface of the cathode 15. Similarly, the second porous bed 98 comprises an upstanding substantially cylindrical mass of substantially bead-like particles of anion exchange material, and the adjacent foraminous screen 99 not only accommodates the circulation of a first portion of the third stream of water through the second bed 98, but it also defines an unobstructed annular channel interiorly thereof adjacent to the exterior surface of the anode 32 for the passage of a second portion of the third stream of water into scrubbing relationship with the exterior surface of the anode 32.

The cation exchange material of the first porous bed 96 essentially consists of a cation exchange resin comprising a stable insoluble synthetic organic polymer, active acidic functional groups chemically bonded thereto, and dissociable into free mobile cations to impart a negative charge to the polymer, and water in gel relationship with the polymer. Similarly, the anion exchange material of the second porous bed 98 essentially consists of an anion exchange resin comprising a stable insoluble synthetic organic polymer, active basic functional groups chemically bonded thereto, and dissociable into free mobile anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical polymers to which the active acidic functional groups may be attached include: phenol-aldehyde resins, polystyrene-divinylbenzene copolymers, and the like; and such suitable active acidic functional groups include: —$SO_3H$, —COOH, and the like; —$SO_3H$ being usually preferred because of its high dissociation constant. Typical polymers to which the active basic functional groups may be attached include: urea-formaldehyde resins, melamine - formaldehyde resins, polyalkylene - polyamineformaldehyde resins, and the like; and such suitable active basic functional groups include: quaternary ammonium hydroxides, amino groups, the guanidyl group, the dicyandiamidine group, and like organic nitrogen-containing basic groups; the quaternary ammonium hydroxide groups, the guanidine and the dicyandiamidine residue being usually preferred because of their high dissociation constants. Normally, the water in gel relationship with the polymer should be present in an amount of at least 15% of the weight of the dry resin.

Such cation exchange resins readily exchange the H+ or equivalent ion of the acidic functional groups for the corresponding cations Ca++, etc., of the electrolyte dissolved in the water undergoing the demineralizing action; and such anion exchange resins readily exchange the OH− or equivalent ion of the basic functional groups for the corresponding anions Cl−, etc., of the electrolyte dissolved in the water undergoing the demineralizing action.

As a practical embodiment, the bed 96 of cation exchange material may comprise the bead-like strong-acid resin of the character described that is sold under the name "Amberlite IR–120"; and the bed 98 of anion exchange material may comprise the bead-like strong-base resin of the character described that is sold under the name "Amberlite IRA–410."

Considering now the normal operation of the cell 11, a relatively high direct voltage is applied between the anode 32 and the cathode 15, a first stream of water to be demineralized is passed downwardly through the first chamber 43 defined through the composite structure 42, a second stream of water is passed upwardly through the second chamber 44 disposed adjacent to the cathode 15, and a third stream of water is passed upwardly through the third chamber 45 disposed adjacent to the anode 32. The first stream of water is in counterflow relation with respect to the second and and third streams of water, as previously noted, and the ions of the electrolyte dissolved in the first stream of water are subjected to electrodialysis, a direct current passing from the anode 32 to the cathode 15 through the three streams of water named, the composite structure 42 and the two ion exchange beds 96 and 98; whereby the cations Ca++, etc., migrate from the first stream of water through the outer wall membrane of the composite structure 42 and through the cation exchange bed 96 toward the cathode 15, and the anions Cl−, etc., migrate from the first stream of water through the inner wall or membrane of the composite structure 42 and through the anion exchange bed 98 toward the anode 32. Some of the cations Ca++, etc., are exchanged in the cation exchange bed 96 with the simple cations H+, and other of the cations Ca++, etc., migrate into the second stream of water that is arranged in scrubbing relation with the cathode 15; whereby these cations are swept along with the second stream of water through the chamber 44 and thence into the upper header 14. As time proceeds, some of the exchanged cations Ca++, etc., in the cation exchange bed 96 are re-exchanged with simple H+ cations due to the potential present through the bed 96; whereby these cations are ultimately swept along with the second stream of water into the upper header 14. Some of the anions Cl−, etc., are exchanged in the anion exchange bed 98 with the simple OH− anions, and other of the anions Cl−, etc., migrate into the third stream of water that is arranged in scrubbing relation with the anode 32; whereby these anions are swept along with the third stream of water through the chamber 45 and thence into the upper header 14. As time proceeds, some of the exchanged anions Cl−, etc., in the anion exchange bed 98 are re-exchanged with simple OH− anions due to the potential present through the bed 98; whereby these anions are ultimately swept along with the third stream of water into the upper header 14. The exact mode of exchange and re-exchange of the cations involved in the cation exchange bed 96 and the mode of exchange and re-exchange of the anions involved in the anion exchange bed 98 are not fully understood, but it is surmised that these anions and cations trapped in the water in the gels respectively associated with the polymers are in highly dissociated relation and subject to migration under the influence of the electric field respectively toward the cathode 15 and toward the anode 32; and in any case, and without reference to the exact modes mentioned, it has been discovered that the ion exchange beds 96 and 98 are not expended and require no chemical regeneration, as is usually necessary in conjunction with the use of such ion exchange beds, as normally employed. Accordingly, it is not necessary in the operation of the cell 11 to regenerate the ion exchange beds 96 and 98; whereby the cell 11 is ideally suited for home use.

Of course, the electro-dialysis involved effects the demineralization of the first stream of water passing downwardly through the composite structure 42 and the consequent transportation of the cations and the anions therefrom into the upper header 14, and the ultimate discharge thereof to the exterior.

In the normal operation of the cell 11, Chicago raw water containing a total dissolved solids count of about 157 p. p. m. (a total hardness equivalency of $CaCO_3$ of 125 p. p. m.) may be readily demineralized approximately 75% at a rate of about 8 gallons per hour employing a D. C. voltage of about 110 volts and drawing a direct current of about 2 amperes; which demineralization is entirely adequate to render the water altogether satisfactory for drinking, washing, cooking and other purposes; whereby, during normal operation of the cell 11, approximately 220 watts are consumed. Also during normal operation of the cell 11 in the treatment of Chicago raw water, as described above, the rate of flow of the cathode sweep water through the second chamber 44, and the rate of flow of the anode sweep water through the third chamber 45 may each be about 10% of the rate of flow of the treated water through the first chamber 43, or about 0.8 gallon per hour.

Of course, it will be understood that in the cell 11, relatively higher and lower rates of demineralization may be respectively achieved employing respectively lower and higher rates of flow of the treated water through the first chamber 43. Accordingly, it will be appreciated that by the utilization of an appropriate number of the cells 11, 12, etc., in a system, both the required demineralization rate (with respect to the percentage removal of the undesirable ions) and the required rate of flow of the treated water (with respect to gallons per hour) may be readily achieved. The example mentioned is based upon the utilization of the cell 11 that was expressly designed for home use, the height of the cathode 15 between the lower header 13 and the upper header 14 being approximately 33⅛" and the outside diameter thereof being approximately 2½", and the dimensions of the other parts being approximately related in the general manner indicated in Figs. 2 and 3; whereby the total height of the cell 11 between the lower surface of the lower mounting ring 18 and the upper surface of the upper mounting ring 20 is approximately 37⅛".

As previously noted, the anode 32 is upwardly tapered; whereby the space between the anode 32 and the cathode 15 is downwardly tapered; which arrangement is useful in that the treated water proceeding downwardly through the first chamber 43 contains a progressively smaller concentration of the electrolytes dissolved therein so that the resistance thereof progressively increases from the top end toward the bottom end of the first chamber 43. The taper of the anode 32 compensates for this progressive increase in the resistance of the treated water downwardly in the first chamber 43; whereby the electrodializing action thereon is substantially uniform from the top toward the bottom of the composite picture 42.

Considering now the standby operation of the cell 11, a relatively low direct voltage is applied between the anode 32 and the cathode 15, and the supply of water through the composite structure 42 and through the second and third chambers 44 and 45 is cut-off; whereby a body of the partially demineralized water is contained in the first chamber 43 defined within the composite structure 42, a body of cathode sweep water is contained in the second chamber 44 adjacent to the cathode 15, and a body of anode sweep water is contained in the third chamber 45 adjacent to the anode 32. The electric field applied between the anode 32 and the cathode 15 is sufficient to prevent back-migration of the cations $Ca^{++}$, etc., from the body of cathode sweep water back through the outer wall or membrane of the composite structure 42 into the body of partially demineralized water contained in the first chamber 43; and likewise, the electric field applied between the anode 32 and the cathode 15 is sufficient to prevent back-migration of the anions $Cl^-$, etc., from the body of anode sweep water back through the inner wall or membrane of the composite structure 42 into the body of partially demineralized water contained in the first chamber mentioned. Also, the cation exchange bed 96 is useful to prevent back-migration of the cations $Ca^{++}$, etc. into the body of partially demineralized water contained in the first chamber 43; and similarly, the anion exchange bed 98 is useful to prevent back-migration of the anions $Cl^-$, etc., into the body of partially demineralized water contained in the first chamber 43. This composite arrangement for preventing back-migration of the cations and anions into the body of partially demineralized water contained in the first chamber 43 is very advantageous, since the normal concentration of the cations in the body of cathode sweep water contained in the second chamber 44 is normally considerably greater than that in the body of partially demineralized water contained in the first chamber 43, and since the normal concentration of the anions in the body of anode sweep water contained in the third chamber 45 is normally considerably greater than that in the body of partially demineralized water contained in the first chamber 43.

In the illustrated embodiment of the cell 11, the relatively low direct voltage that is applied between the anode and the cathode during standby operation may be about 35 volts so that the cell 11 draws a direct current of about 0.63 ampere; whereby, during standby operation of the cell 11, approximately 22 watts are consumed.

Again referring to Fig. 1, the system further comprises a pipe 100 for supplying raw water to be treated under pressure into the lower header 13, as well as a filter 101, also communicating with the lower header 13 and provided with a replaceable filter plate or cartridge 102. As previously noted, the right-hand cell 12 is substantially identical to the left-hand cell 11, whereby water to be treated is supplied to the upper portion of the composite structure therein, not shown (corresponding to the composite structure 42 in the left-hand cell 11), via an inlet conduit 84'; and treated water is removed from the lower portion of the composite structure mentioned via an outlet conduit 85'. The outlet of the filter 101 communicates commonly with the two inlet conduits 84 and 84' respectively extending to the cells 11 and 12; and the outlet conduits 85 and 85' respectively extending from the cells 11 and 12 are brought to a common junction and connected to a discharge conduit 103. Further, the upper header 14 communicates with a drain conduit 104, that, in turn, communicates with a catalytic reacting device 105, that, in turn, communicates with a drain conduit 106.

An anti-water hammer air-containing stand column 107 is arranged in the discharge conduit 103; and further, the discharge conduit 103 communicates with a conventional pressure regulator 108 of the throttling-valve type, that, in turn, communicates with a treated water-pipe 109, in which there is arranged a manually controllable valve 110. The pressure regulator 108 includes a diaphragm, not shown, defining a lower chamber communicating with the treated water supply pipe 109 and an upper chamber communicating via a tube 111 with the raw water supply pipe 100; whereby the pressure regulator 108 is governed jointly by the pressure of the water in the pipes 109 and 100 and functions to throttle and to control the rate of flow of the water through the pipe 109, when the associated valve 110 occupies its open position, so as to maintain the pressure of the two parallel streams of water passing through the two first chambers in the two cells 11 and 12 at a substantially fixed pressure. Similarly, an anti-water hammer air-containing stand column 112 is arranged in the drain conduit 106; and further, the drain conduit 106 communicates with a conventional pressure regulator 113 of the throttling-valve type, that, in turn, communicates with a drain water pipe 114, in which there is arranged an electrically controlled solenoid valve 115. The solenoid valve 115 is normally biased into its closed position and is operable into its open position in response to energization of the solenoid 116 thereof. The pressure regulator 113 includes a diaphragm, not shown, defining a lower chamber communicating with the discharge conduit 106 and an upper chamber communicating via a tube 117 with the raw water supply pipe 100; whereby the pressure regulator 113 is governed jointly by the pressure of the water in the pipes 106 and 100 and functions to throttle and to control the rate of flow of the water through the pipe 114, when the associated solenoid valve 115 occupies its open position, so as to maintain the pressure of the four parallel streams of water respectively passing through the two second chambers and the two third chambers in the two cells 11 and 12 at a substantially fixed pressure.

Thus the two pressure regulators 108 and 113 tend to maintain substantially predetermined internal and external pressures upon the composite structures arranged within the cells 11 and 12, thereby preventing abnormal differential pressures in either direction upon the composite structures mentioned, so as to prevent damage thereto and to avoid any substantial tendency of the streams of water to permeate the composite structures mentioned in either direction therethrough. More particularly, the pressure regulator 108 throttles the rate of flow of the water through the treated water pipe 109, when the manual valve 110 occupies its open position, so as to maintain an adequate back-pressure interiorly of the composite structures in the cells 11 and 12, thereby preventing collapsing thereof. On the other hand, the pressure regulator 113 throttles the rate of flow of the water through the drain pipe 114, when the solenoid valve 115 occupies its open position, so as to maintain an adequate back pressure exteriorly of the composite structures in the cells 11 and 12, thereby preventing bursting thereof. For example, in the event the raw water in the supply pipe 100 is at a pressure of 45# per square inch, the pressure regulator 108 may maintain a pressure of about 44# per square inch of the water in the connected discharge conduit 103, and the pressure regulator 113 may maintain a pressure of about 44# per square inch of the water in the connected drain conduit 106.

Finally, the system comprises a source of power that may be 110 volts, single-phase, A. C., a conventional power converter or rectifying unit 118 and a flow switch 119. The power rectifying unit 118 is provided with a common grounded negative output terminal G, a low voltage ungrounded + output terminal L and a high voltage ungrounded + output terminal H; whereby a relatively low direct voltage of about 35 volts is impressed between the output terminals G and L and a relatively high direct voltage of about 110 volts is impressed between the output terminals G and H. The flow switch 119 is of the conventional pressure controlled type selectively governed in response to the flow of water through the treated water pipe 109 and may include a pressure responsive bellows 120 communicating via a tube 121 with the pipe 109. Also, the flow switch 119 includes a single-throw blade 122 and a double-throw blade 123; three line terminals respectively connected to the output terminals G, L and H of the power unit 118; and three load terminals 124, 125 and 126. The load terminal 126 is commonly connected to one terminal of the solenoid 116, to the lower header 13 (and consequently in parallel to the two cathodes of the two cells 11 and 12), and to ground potential, as indicated at 127. The load terminal 124 is connected to the other terminal of the solenoid 116; and the load terminal 125 is connected in parallel to the two anodes of the two cells 11 and 12.

In the flow switch 119, the bellows 120 is controlled by the pressure of the water in the treated water pipe 109; whereby, when the valve 110 occupies its closed position, the switch blade 122 opens its associated contacts deenergizing the solenoid 116 to effect closure of the solenoid valve 115, and the switch blade 123 closes its associated back contacts connecting its load terminal 125 to the output terminal L of the power unit 118 so that the relatively low direct voltage is impressed between the anodes and the cathodes of the cells 11 and 12; and whereby, when the valve 110 occupies its open position, the switch blade 122 closes its associated contacts energizing the solenoid 116 to effect opening of the solenoid valve 115, and the switch blade 123 closes its associated front contacts connecting its load terminal 125 to the output terminal H of the power unit 118 so that the relatively high direct voltage is impressed between the anodes and the cathodes of the cells 11 and 12. Accordingly, when the valve 110 occupies its closed position, the flow switch 119 is controlled to effect the application of the relatively low direct "standby" voltage between the anodes and the cathodes of the cells 11 and 12, and to effect closure of the solenoid valve 115; on the other hand, when the valve 110 occupies its open position, the flow switch 119 is controlled to effect the application of the relatively high direct "operating" voltage between the anodes and the cahtodes of the cells 11 and 12, and to effect opening of the solenoid valve 115. This automatic control of the standby and operating voltages applied between the anodes and the cathodes of the cells 11 and 12 is employed for a purpose more fully explained hereinafter; while this automatic control of the solenoid valve 115 prevents the development of undesirable differential water pressures between the interior and the exterior of the composite structures in the cells 11 and 12.

Considering now the operation of the system, it will be understood that when the valve 110 is opened to initiate the supply of treated water via the treated water pipe 109, the operating voltage is applied between the anodes and the cathodes of the cells 11 and 12, and the solenoid valve 115 is operated into its open position, in the manner previously explained; whereby the raw water is supplied via the raw water supply pipe 100 into the lower header 13 and therefrom upwardly through the filter 101 to remove any sediment therefrom, and thence via the inlet conduits 84 and 84′ into the upper portions of the composite structures in the respective cells 11 and 12, and then downwardly in two streams therethrough; whereby these two streams of water are demineralized, subsequently combined in the discharge conduit 103, and ultimately supplied to the treated water pipe 109. Simultaneously, the raw water proceeds from the lower header 13 upwardly directly through the two cathode passages and the two anode passages in the two cells 11 and 12, and are combined in the upper header 14; whereby the combined anode and cathode streams of water pass through the catalytic reacting device 109, and ultimately through the drain pipe 114. The two cathode streams of water proceeding through the cells 11 and 12 carry the cations $Ca^{++}$, etc., as well as some gaseous hydrogen, therewith into the upper header 14; the two anode streams of water proceeding through the cells 11 and 12 carry the anions $Cl^-$, etc., as well as some gaseous oxygen, therewith into the upper header 14; whereby the combined stream of water passing from the upper header 14 into the catalytic reaction device 105 has suspended therein both gaseous hydrogen and gaseous oxygen. The catalytic reacting device 105 contains a suitable charge of catalytic reacting material capable of recombining the gaseous hydrogen and the gaseous oxygen to form water so as to eliminate any explosion-hazard. In the arrangement, the catalytic reacting device 105 may contain a mass of catalytic pellets essentially of the platinum or iridium type. Accordingly, this arrangement not only eliminates the explosion-hazard mentioned, but it also minimizes the amount of dissolved gases that are discharged from the drain pipe 114.

When the valve 110 is closed to arrest the supply of terated water via the treated water pipe 109, the standby voltage is applied between the anodes and the cathodes of the cells 11 and 12, and the solenoid valve 115 is operated into its closed position, in the manner previously explained. Thus at this time, the supply of raw water fiom the raw water supply piping 100 to the lower header 113 is arrested, and the standby voltage applied between the anodes and the cathodes of the cells 11 and 12 prevents back-diffusion of the cations and the anions from the respective bodies of water contained in the respective cation and anion sweep passages in the cells 11 and 12 back into the respective bodies of water contained in the treatment passages in the cells 11 and 12. The last-mentioned arrangement preventing the back-diffusion of the cations and the anions, eliminates the possibility that a quantity of only partially demineralized water will be supplied through the treated water pipe 109 incident to the opening of the valve 110, after it has been closed for an extended time interval.

Referring now to Fig. 4, there is illustrated a modified form of mechanism that may be incorporated in the cell 11 for the purpose of controlling the flow of the second and third streams of solvent through the respective second and third chambers 44 and 45; which mechanism includes a casing 200 that may be secured in place in the cavity provided in the lower end of the lower insulating block 22. More particularly, the casing 200 includes complementary lower and upper sections 201 and 202 secured together in threaded relation. Two chambers 203 and 204 are defined within the lower section 201 and arranged in communication with each other via a composite passage therebetween defined by a sharp-edged orifice 205 formed in a relatively thin plate 206 and by an enlarged communicating opening formed in a relatively thick plate 207. The chambers 203 and 204 respectively communicate with first and second series of openings 208 and 209 formed in the lower section 201, and respectively corresponding to the two series of openings 57 and 60 formed in the valve casing 46. Another chamber 210 is defined mutually between the lower and upper sections 201 and 202, and communicates with the passage 62 formed in the lower insulating block 22, and also communicates via a composite passage defined by a sharp-edged orifice 211 formed in a relatively thin plate 212 and by an enlarged communicating opening formed in a relatively thick plate 213 with an opening 214 formed in the upper section 202, and corresponding to the opening 64 formed in the valve casing 46.

Thus, it will be understood that the second stream of liquid solvent that passes through the second chamber 44 first passes through the sharp-edged orifice 205, whereby the rate of flow thereof is automatically established at a predetermined value substantially independent of the pressure in the lower header 13; and likewise, the third stream of liquid solvent that passes through the third chamber 45 first passes through the sharp-edged orifice 211, whereby the rate of flow thereof is automatically established at a predetermined value substantially independent of the pressure in the lower header 13. Of course, it is apparent that by appropriately predetermining the sizes of the two sharp-edged orifices 205 and 211, the rates of flow of the two streams mentioned may be appropriately pre-established, since a sharp-edged orifice has an inherent characteristic of accommodating a substantially constant rate of liquid flow therethrough substantially independent of the pressure of the liquid over a very wide pressure range.

In view of the foregoing, it is apparent that there has been provided an improved raw water demineralizing cell and system that is expressly designed as a home unit so that it requires no regeneration, attention or supervision on the part of the home user in the operation thereof. Of course, it will be understood that both the cell and the system may be employed for the extraction of the ions of electrolytes from other liquid solvents, and in some cases the system may be employed, not fundamentally to obtain a solvent free of undesirable ions of electrolytes, but to obtain a solvent in which desirable ions of electrolytes have been concentrated. Restating the matter in terms of the present system, the concentration of the electrolyte in the solvent in the pipe 109 has been greatly reduced with respect to the concentration of the electrolyte in the solvent in the pipe 100, and the concentration of the electrolyte in the solvent in the pipe 114 has been greatly increased with respect to the concentration of the electrolyte in the solvent in the pipe 100.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A cell for extracting the ions of an electrolyte from a liquid solvent comprising a first elongated imperforate tubular electrode, a second substantially rod-like electrode arranged within and substantially along the longitudinal axis of said first electrode and electrically insulated therefrom, an elongated coil of tubular permeable material arranged within said first electrode and spaced inwardly therefrom and surrounding said second electrode and spaced outwardly therefrom and defining a first liquid passage through the turns thereof, the adjacent turns of said coil being sealed to each other so that the exterior surface of said coil constitutes a first permeable membrane cooperating with said first electrode to define a second liquid passage therebetween and the interior surface of said coil constitutes a second permeable membrane cooperating with said second electrode to define a third liquid passage therebetween, means for conducting a first stream of liquid solvent containing an electrolyte through said first liquid passage, means for conducting second and third streams of liquid solvent respectively through said second and third liquid passages, and means for passing a direct electric current between said electrodes through said first and second and third streams of liquid solvent and through said first and second membranes, whereby the ions of the electrolyte contained in said first stream of liquid solvent are subjected to electro-dialysis through said first and second membranes and the ions of opposite polarities respectively migrating toward said first electrode and toward said second electrode are swept respectively along with said second and third streams of liquid solvent respectively from said second and third liquid passages.

2. The cell set forth in claim 1, wherein said means for conducting said first stream of liquid solvent through said first liquid passage includes a first inlet port disposed at one end of said cell and a first outlet port disposed at the other end of said cell, and said means for conducting second and third streams of liquid solvent respectively through said second and third liquid passages respectively include second and third inlet ports disposed at said other end of said cell and second and third outlet ports disposed at said one end of said cell, whereby the flow of said first stream of liquid solvent through said first liquid passage is in a direction counter to the direction of flow of said second and third streams of liquid solvent respectively through said second and third liquid passages.

3. The cell set forth in claim 2, wherein the cross-sectional area of said second electrode progressively increases from said one end of said cell toward said other end thereof and thus in the direction of flow of said first stream of liquid solvent.

4. The cell set forth in claim 1, wherein said material consists essentially of a textile fabric impregnated with cellulose acetate.

5. The cell set forth in claim 1, wherein said first electrode is formed essentially of stainless steel and constitutes a cathode, and said second electrode is formed essentially of carbon and constitutes an anode.

6. The cell set forth in claim 1, and further comprising first means including a first plate having a sharp-edged orifice therein for establishing a predetermined flow of said second stream of liquid solvent through said second liquid passage, and second means including a second plate having a sharp-edged orifice therein for establishing a predetermined flow of said third stream of liquid solvent through said third liquid passage.

7. A cell for extracting ions from an aqueous solution of a metal salt comprising a first elongated imperforate tubular electrode, a second substantially rod-like electrode arranged within and substantially along the longitudinal axis of said first electrode and electrically insulated therefrom, an elongated coil of tubular permeable material arranged within said first electrode and spaced inwardly therefrom and surrounding said second electrode and spaced outwardly therefrom and defining a first liquid passage through the turns thereof, the adjacent turns of said coil being sealed to each other so that the exterior surface of said coil constitutes a first permeable membrane cooperating with said first electrode to define a second liquid passage therebetween and the interior surface of said coil constitutes a second permeable membrane cooperating with said second electrode to define a third liquid passage therebtween, means for conducting a first stream of an aqueous solution of a metal salt through said first liquid passage, means for conducting second and third streams of liquid solvent respectively through said second and third liquid passages, means for passing a direct electric current between said electrodes through said first stream of aqueous solution and through said second and third streams of liquid solvent and through said first and second membrane, whereby the ions of the metal salt in said first stream of aqueous solution are subjected to electro-dialysis through said first and second membranes and the ions of opposite polarities respectively migrating toward said first and second electrodes are swept respectively along with said second and third streams of liquid solvent respectively from said second and third liquid passages, a conduit for combining said second and third streams of liquid solvent after conduction thereof respectively through said second and third liquid passages, and a catalytic reacting device arranged in said conduit for reacting gaseous hydrogen and oxygen resulting from electrolytic decomposition of water from said first stream of aqueous solution and suspended in said combined stream of liquid solvent so as to reduce explosion hazard.

8. A system for extracting the ions of an electrolyte from a liquid solvent comprising a cell provided with first and second and third chambers and including a first permeable membrane as a common wall between said first and second chambers and a second permeable membrane as a common wall between said first and third chambers, a cathode arranged in said second chamber, an anode arranged in said third chamber, an inlet pipe communicating with said first chamber and adapted to be supplied with liquid solvent under gauge pressure and containing an electrolyte, an outlet pipe communicating with said first chamber, means for conducting a first stream of the liquid solvent from said inlet pipe through said first chamber and thence into said outlet pipe, means for conducting second and third streams of liquid solvent respectively through said second and third chambers, a first source of relatively high direct voltage, a second source of relatively low direct voltage, a switch having first and second positions respectively connecting said first and second sources to said anode and said cathode, and means including a device responsive to the pressure in said outlet pipe for selectively operating said switch, said device being responsive to a relatively low pressure in said outlet pipe to operate said switch into its first position and responsive to a relatively high pressure in said outlet pipe to operate said switch into its second position, said relatively high direct voltage impressed between said anode and said cathode subjecting the ions of the electrolyte contained in said first stream of liquid solvent to electrodialysis through said first and second membranes so that the ions of opposite polarities respectively migrating toward said cathode and toward said anode are swept respectively along with said second and third streams of liquid solvent respectively from said second and third chambers, said relatively low direct voltage impressed between said anode and said cathode subjecting the ions of the electrolyte contained in the two bodies of liquid solvent respectively contained in said second and third chambers to an electric field so as to prevent diffusion thereof respectively through said first and second membranes back into the body of liquid solvent contained in said first chamber.

9. A system for demineralizing raw water comprising a cell provided with first and second and third chambers and including a first permeable membrane as a common wall between said first and second chambers and a second permeable membrane as a common wall between said first and third chambers, a cathode arranged in said second chamber, an anode arranged in said third chamber, an inlet pipe for supplying raw water under pressure commonly into said first and second and third chambers, an outlet pipe communicating with said first chamber, a drain pipe commonly communicating with said second and third chambers, means for selectively conducting a first stream of water from said inlet pipe through said first chamber and then through said outlet pipe, a valve arranged in said drain pipe, means responsive to initiation of flow of said first stream of water through said outlet pipe for operating said valve from its closed position into its open position and responsive to arresting of flow of said first stream of water through said outlet pipe for operating said valve from its open position into its closed position, second and third streams of water being conducted from said inlet pipe respectively through said second and third chambers and then as a combined stream of water through said drain pipe in response to operation of said valve into its open position, a first regulator governed jointly by the pressure of the water in said inlet pipe and by the pressure of the water in said outlet pipe for selectively controlling the rate of flow of said first stream of water through said outlet pipe, a second regulator governed jointly by the pressure of the water in said inlet pipe and by the pressure of the water in said drain pipe for selectively controlling the rate of flow of said combined stream of water through said drain pipe, and means for passing a direct electric current from said anode to said cathode through said first and second and third streams of water respectively passing through said first and second and third chambers and through said first and second membranes, whereby the ions of the electrolytes contained in said first stream of water are subjected to electro-dialysis through said first and second membranes so that the ions of opposite polarities respectively migrating toward said cathode and toward said anode are swept respectively along with said second and third streams of water respectively from said second and third chambers and thence with said combined stream of water through said drain pipe.

10. A system for demineralizing raw water comprising an upstanding cell provided with first and second and third upstanding chambers and including a first permeable membrane as a common wall between said first and second chambers and a second permeable membrane as a common wall between said first and third chambers, a cathode arranged in said second chamber, an anode arranged in said third chamber, a lower header commonly communicating with the upper end of said first chamber and with the lower ends of said second and third chambers, an inlet pipe for supplying raw water under pressure into said lower header, an outlet pipe communicating with the lower end of said first chamber, an upper header commonly communicating with the upper ends of said second and third chambers, a drain pipe communicating with said upper header, means for selectively conducting a first stream of water from said lower header downwardly through said first chamber and then through said outlet pipe, a valve arranged in said drain pipe, means responsive to initiation of flow of said first stream of water through said outlet pipe for operating said valve from its closed position into its open position and responsive to arresting of flow of said first stream of water through said outlet pipe for operating said valve from its open position into its closed position, second and third streams of water being conducted from said lower header upwardly respectively through said second and third chambers and then as a combined stream of water through said upper header and said drain pipe in response to operation of said valve into its open position, a first regulator governed jointly by the pressure of the water in said inlet pipe and by the pressure of the water in said outlet pipe for selectively controlling the rate of flow of said first stream of water through said outlet pipe, a second regulator governed jointly by the pressure of the water in said inlet pipe and by the pressure of the water in said drain pipe for selectively controlling the rate of flow of said combined stream of water through said drain pipe, and means for passing a direct electric current from said anode to said cathode through said first and second and third streams of water respectively passing through said first and second and third chambers and through said first and second membranes, whereby the ions of the electrolytes contained in said first stream of water are subjected to electro-dialysis through said first and second membranes so that the ions of opposite polarities respectively migrating toward said cathode and toward said anode are swept respectively along with said second and third streams of water respectively from said second and third chambers and thence with said combined stream of water through said upper header and said drain pipe.

11. The system set forth in claim 10, and further comprising a filter arranged in said communication between said lower header and the upper end of said first chamber.

12. The system set forth in claim 10, and further comprising a catalytic reacting device arranged in said drain conduit for reacting gaseous hydrogen and oxygen resulting from electrolytic decomposition of water in said cell and suspended in said combined stream of water in said drain conduit so as to reduce explosion hazard.

13. A system for demineralizing raw water comprising a plurality of upstanding cells, each of said cells being provided with first and second and third upstanding chambers and including a first permeable membrane as a common wall between said first and second chambers and a second permeable membrane as a common wall between said first and third chambers, a plurality of cathodes respectively arranged in said second chambers, a plurality of anodes respectively arranged in said third chambers, a filter, a lower header commonly communicating with the inlet of said filter and with the lower ends of said second and third chambers, the outlet of said filter commonly communicating with the upper ends of said first chambers, an inlet pipe for supplying raw water under pressure into said lower header, an outlet pipe commonly communicating with the lower ends of said first chambers, an upper header commonly communicating with the upper ends of said second and third chambers, a drain pipe communicating with said upper header, means for selectively conducting a plurality of first streams of water from said lower header downwardly respectively through said first chambers and then as a first combined stream of water through said outlet pipe, a valve arranged in said drain pipe, means responsive to initiation of flow of said first combined stream of water through said outlet pipe for operating said valve from its closed position into its open position and responsive to arresting of the flow of said first combined stream of water through said outlet pipe for operating said valve from its open position into its closed position, a plurality of second streams of water and a plurality of third streams of water being conducted from said lower header upwardly respectively through said second and third chambers and then as a combined second stream of water through said drain pipe in response to operation of said valve into its open position, a first regulator governed jointly by the pressure of the water in said inlet pipe and by the pressure of the water in said outlet pipe for selectively controlling the rate of flow of said first combined stream of water through said outlet pipe, a second regulator governed jointly by the pressure of the water in said inlet pipe and by the pressure of the water in said drain pipe for selectively controlling the rate of flow of said second combined stream of water through said drain pipe, and means for passing a plurality of direct electric currents respectively from said anodes to the corresponding ones of said cathodes through the corresponding ones of said first and second and third streams of water respectively passing through the corresponding ones of said first and second and third chambers and through the corresponding ones of said first and second membranes, whereby the ions of the electrolytes contained in each of said first streams of water are subjected to electro-dialysis through the corresponding ones of said first and second membranes so that the ions of opposite polarities respectively migrating toward the corresponding one of said cathodes and toward the corresponding one of said anodes are swept respectively along with the corresponding ones of said second and third streams of water respectively from the corresponding ones of said second and third chambers and thence with said second combined stream of water through said upper header and said drain pipe.

14. A cell for extracting the ions of an electrolyte from a liquid solvent comprising structure defining first and second and third chambers and including a first permeable membrane as a common wall between said first and second chambers and a second permeable membrane as a common wall between said first and third chambers, a cathode arranged in said second chamber, an anode arranged in said third chamber, a first porous bed of cation exchange material arranged in said second chamber between said cathode and said first membrane, a second porous bed of anion exchange material arranged in said third chamber between said anode and said second membrane, an inlet pipe communicating with said first chamber and adapted to be supplied with liquid solvent containing an electrolyte, an outlet pipe communicating with said first chamber, means for conducting a first stream of the liquid solvent from said inlet pipe through said first chamber and into contact with said first and second membranes and thence into said outlet pipe, means for conducting a second stream of liquid solvent through said second chamber and through said first bed and into contact with said cathode and said first membrane, means for conducting a third stream of liquid solvent through said third chamber and through said second bed and into contact with said anode and said second membrane, and means for passing a direct electric current from said anode to said cathode through said first and second and third streams of liquid solvent and through said first and second membranes and through said first and second beds, whereby the cations and the anions of the electrolyte contained in said first stream of liquid solvent are subjected to electro-dialysis respectively through said first and second membranes and migrate respectively through said first bed toward said cathode and through said second bed toward said anode and are swept respectively along with said second and third streams of liquid solvent respectively from said second and third chambers with the result that the liquid solvent in said outlet pipe contains a reduced concentration of electrolyte with respect to that in said inlet pipe.

15. The cell set forth in claim 14, wherein said first bed essentially consists of a mass of substantially bead-like particles of a synthetic organic polymeric cation exchange resin and said second bed essentially consists of a mass of substantially bead-like particles of a snythetic organic polymeric anion exchange resin, and further comprising a first foraminous screen arranged in said second chamber and retaining said first bed in position against said first membrane, and a second foraminous screen arranged in said third chamber and retaining said second bed in position against said second membrane.

16. The cell set forth in claim 14, wherein said first bed essentially consists of a cation exchange resin comprising a synthetic organic polymer, active acidic functional groups chemically bonded thereto and dissociable into free mobile cations to impart a negative charge thereto, and water in gel relationship therewith; and wherein said second bed essentially consists of an anion exchange resin comprising a synthetic organic polymer, active basic functional groups chemically bonded thereto and dissociable into free mobile anions to impart a positive charge thereto, and water in gel relationship therewith.

17. In a cell for extracting the ions of an electrolyte from a liquid solvent including structure defining first and second and third chambers and provided with a first permeable membrane as a common wall between said first and second chambers and a second permeable membrane as a common wall between said first and third chambers, a cathode arranged in said second chamber, an anode arranged in said third chamber, an inlet pipe communicating with said first chamber and adapted to be supplied with liquid solvent containing an electrolyte, an outlet pipe communicating with said first chamber, means for conducting a first stream of the liquid solvent from said inlet pipe through said first chamber and into contact with said first and second membranes and thence into said outlet pipe, means for conducting a second stream of liquid solvent through said second chamber and in to contact with said cathode and said first membrane, means for conducting a third stream of liquid solvent through said third chamber and into contact with said anode and said second membrane, and means for passing a direct electric current from said anode to said cathode through said first and second and third streams of liquid solvent and through said first and second membranes, whereby the cations and the anions of the electrolyte contained in said first stream of liquid solvent are subjected to electro-dialysis respectively through said first and second membranes and migrate respectively toward said cathode and toward said anode and are swept respectively along with said second and third streams of liquid solvent respectively from said second and third chambers with the result that the liquid solvent in said outlet pipe contains a reduced concentration of electrolyte with respect to that in said inlet pipe; the combination comprising a first porous ion exchange bed arranged in said second chamber in interposed relation with respect to said first membrane and said cathode so that said direct electric current is passed therethrough, said first porous ion exchange bed consisting essentially of a loosely packed mass of discrete particles of synthetic organic polymeric cation exchange resin and accommodating the ready passage therethrough of said second stream of liquid solvent, and a second porous ion exchange bed arranged in said third chamber in interposed relation with respect to said second membrane and said anode so that said direct electric current is passed therethrough, said second porous ion exchange bed consisting essentially of a loosely packed mass of discrete particles of synthetic organic polymeric cation exchange resin and accommodating the ready passage therethrough of said third stream of liquid solvent.

References Cited in the file of this patent

UNITED STATES PATENTS

| | | |
|---|---|---|
| 1,677,032 | Kaffer | July 10, 1928 |
| 1,840,105 | Kean | Jan. 5, 1932 |
| 1,869,153 | Kean | July 26, 1932 |
| 1,901,652 | Kean | Mar. 14, 1933 |
| 2,502,614 | Zender | Apr. 4, 1950 |
| 2,508,523 | Krebs | May 23, 1950 |
| 2,593,540 | Cornwell | Apr. 22, 1952 |
| 2,763,607 | Staverman | Sept. 18, 1956 |

FOREIGN PATENTS

| | | |
|---|---|---|
| 5,616 | Great Britain | of 1896 |
| 974,074 | France | Sept. 27, 1950 |
| 652,442 | Great Britain | Apr. 25, 1951 |
| 73,121 | Netherlands | July 30, 1953 |

UNITED STATES PATENT OFFICE

CERTIFICATE OF CORRECTION

Patent No. 2,846,387                                                     August 5, 1958

Edgar S. Stoddard

It is hereby certified that error appears in the printed specification of the above numbered patent requiring correction and that the said Letters Patent should read as corrected below.

Column 19, line 18, claim 17, for "cation exchange" read -- anion exchange --.

Signed and sealed this 28th day of October 1958.

(SEAL)

Attest:

KARL H. AXLINE
Attesting Officer

ROBERT C. WATSON
Commissioner of Patents